United States Patent Office 3,052,718
Patented Sept. 4, 1962

3,052,718
METHOD FOR PREPARING TRIS-(ORGANO-AMINO)BORANES
William David English, Garden Grove, Calif., assignor to United States Borax & Chemical Corporation, Los Angeles, Calif., a corporation of Nevada
No Drawing. Filed Dec. 5, 1960, Ser. No. 73,531
6 Claims. (Cl. 260—551)

The present invention relates as indicated to a method for the preparation of tris(organo-amino)boranes.

It is the principal object of the present invention to provide a method for preparing tris(organo-amino)boranes which is efficient and economically desirable and results in yields of substantially pure product.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method for preparing tris(organo-amino)boranes which comprises cooling at least three moles of a tertiary amine having the general formula:

where R, R' and R" are selected from the group consisting of unsubstituted saturated alkyl groups containing from 1 to 6 carbon atoms, phenyl substituted saturated alkyl groups containing from 1 to 6 carbon atoms, phenyl, naphthyl, phenyl substituted phenyl, and unsubstituted saturated alkyl substituted phenyl, said alkyl groups having from 1–6 carbon atoms, adding about one mole of a compound selected from the group consisting of boron trichloride and boron tribromide, allowing the mixture to warm to about ambient temperature, heating the mixture under reflux and recovering substantially pure tris-(organo-amino)borane.

The following list is a partial enumeration of the teritary amines applicable to the present process:

Trimethylamine
Tri-n-propylamine
Diethylbenzylamine
Methylethylbutylamine
Dimethylphenylamine
Diphenylethylamine
Triphenylamine
Diethylphenylamine
Dimethyl-α-naphthylamine
Dibutyl-p-ethylphenylamine
Diethylbutylamine
Diethyl-4-biphenylamine
Di-n-propyl-n-butylamine Tertiary amines where the nitrogen of the amine is part of a heterocyclic ring which has aromatic character, such as pyridine, and those tertiary amines which contain groups that react preferentially with boron trihalides, such as hydroxyls, and groups containing ether linkages are not applicable to this invention.

The reaction as presented in the broadly stated paragraph can best be shown by the following general equation:

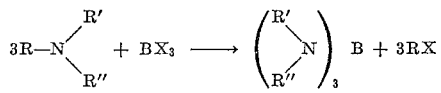

where X is either chlorine or bromine and

is the tertiary amine. The tris(organo-amino)boranes are usually recovered as relatively high boiling liquids when they contain alkyl groups and they are recovered as solids when one or more aryl groups are present.

Stoichiometrically the reaction requires three moles of tertiary amine per mole of boron trihalide; however, in the preferred embodiment of the invention I use excess tertiary amine as the solvent in which the reaction takes place. The reaction can be performed in non-hydroxylic hydrocarbon solvents such as benzene, toluene, mineral oil, xylene, etc.; however, as there is no interreaction of the amine with the final product and since the products and the amine are easily separated one from the other, I prefer to use an excess of the amine as the reaction solvent.

So that the present invention can be more clearly understood, the following examples are given for illustrative purposes:

I

A flask containing 72 grams (0.72 mole) of triethylamine was chilled to —80° C. and 25 grams (0.1 mole) of boron tribromide was added. The mixture was allowed to warm to room temperature and was then heated under reflux for 24 hours. The reaction mass was then fractionally distilled and tris(diethylamino)borane was recovered. Chemical analysis yielded the following data.
Calculated for $C_{12}H_{30}N_3B$: B=4.57%; C=60.81%; N=5.91%. Found in product: B=4.49%; C=60.94%; N=5.85%.

II

Example I was repeated using toluene as the solvent and stoichiometric amounts of triethylamine and boron tribromide, mole ratio of 3:1. The results were comparable with those of Example I.

III

A flask containing 94.4 grams (0.78 mole) of dimethylphenylamine (dimethylaniline) was chilled to —80° C. and 25 grams (0.1 mole) of boron tribromide was added. The mixture was allowed to warm to room temperature and was then heated under reflux for 60 hours. Methylbromide was evolved and collected in a cold trap at —80° C. and the remaining reaction mixture was distilled and tris(N-methylphenylamino)borane was recovered. Chemical analysis yielded the following data:
Calculated for $C_{21}H_{24}N_3B$: B=3.29%; C=76.64%; N=4.25%. Found in product: B=3.21%; C=76.73%; N=4.18%.

IV

A flask containing 163 grams (1 mole) of diethylbenzylamine was chilled to −80° C. and 23.4 grams (0.2 mole) of boron trichloride was added. The mixture was allowed to warm to room temperature and was then heated under reflux for 48 hours. The reaction mass was then fractionally distilled and tris(ethylbenzylamino)-borane was removed. Chemical analysis yielded the following data:

Calculated for $C_{27}H_{36}N_3B$: B=2.62%; C=78.47%; N=3.39%. Found in product: B=2.60%; C=78.63%; N=3.26%.

V

A flask containing 93 grams (0.375 mole) of triphenylamine in 100 ml. of benzene was chilled to −80° C. and 14.7 grams (0.125 mole) of boron trichloride was added. The mixture was allowed to warm to room temperature and was then heated under reflux for 60 hours. The reaction mass was then fractionally distilled and tris-(diphenylamino)borane was recovered. Chemical analysis yield the following data:

Calculated for $C_{36}H_{30}N_3B$: B=2.10%; C=83.91%; N=2.72%. Found in product: B=2.06%; C=84.15%; N=2.64%.

In carrying out the reactions of the present invention it will be noted that the addition of the boron trihalide to the tertiary amine results in an exothermic reaction which could boil off the amine. In order not to lose the amine during the addition of the boron trihalide it is best to cool the flask containing the amine to below about ambient temperature and perferably to a temperature of from about 0° C. to about −80° C.

Other modes of applying the principle of the invention may be employed provided the features stated in any of the following claims or the equivalent of such be employed.

I, therefore, particularly point out and distinctly claim as my invention:

1. The method for preparing tris(organo-amino)boranes which comprises cooling below ambient temperature at least three moles of a tertiary amine having the formula

where R, R′ and R″ are selected from the group consisting of alkyl groups of 1 to 6 carbon atoms, phenyl substituted alkyl groups of 1 to 6 carbon atoms, phenyl, naphthyl, biphenyl, and alkyl substituted phenyl, said alkyl groups of 1 to 6 carbon atoms, adding about one mole of a compound selected from the group consisting of boron trichloride and boron tribromide, allowing the mixture of warm to about ambient temperature, heating the mixture under reflux, and recovering substantially pure tris(organo-amino)borane.

2. The method for preparing tris(organo-amino)boranes which comprises cooling at least three moles of a tertiary amine having the formula

to a temperature of from about 0° to about −80° C., where R, R′ and R″ are selected from the group consisting of alkyl groups of 1 to 6 carbon atoms, phenyl substituted alkyl groups of 1 to 6 carbon atoms, phenyl, naphthyl, biphenyl, and alkyl substituted phenyl, said alkyl groups of 1 to 6 carbon atoms, adding about one mole of a compound selected from the group consisting of boron tribromide boron trichloride, allowing the mixture to warm to about ambient temperature, heating said mixture under reflux and recovering substantially pure tris(organo-amino)boranes from the reaction mass.

3. The method for preparing tris(diethylamino)-borane which comprises cooling at least three moles of triethylamine to a temperature of from 0° C. to about −80° C., adding about one mole of boron tribromide to said triethylamine, allowing the mixture to warm to about ambient temperature, heating said mixture under reflux and recovering substantially pure tris(diethylamino)borane from the reaction mass.

4. The method for preparing tris(N-methylphenylamino)borane which comprises cooling at least three moles of N,N-dimethylaniline to a temperature of from about 0° C. to about −80° C., adding about one mole of boron tribromide to said N,N-dimethylaniline, allowing the mixture to warm to about ambient temperature, heating said mixture under reflux and recovering substantially pure tris(N-methylphenylamino)borane from the reaction mass.

5. The method for preparing tris(ethylbenzylamino)-borane which comprises cooling at least three moles of diethylbenzylamine to a temperature of from about 0° C. to about −80° C., adding about one mole of boron trichloride to said diethylbenzylamine, allowing the mixture to warm to about ambient temperature, heating said mixture under reflux and recovering subsantially pure tris(ethylbenzylamino)borane from the reaction mass.

6. The method for preparing tris(diphenylamino)-borane which comprises cooling a solution containing at least three moles of triphenylamine in benzene to a temperature of from about 0°C. to about −80° C., adding about one mole of boron trichloride to said solution, allowing the mixture to warm to about ambient temperature, heating said mixture under reflux and recvering substantially pure tris(diphenylamino)borane from the reaction mass.

References Cited in the file of this patent

Jones et al.: J. Am. Chem. Soc., volume 61, pages 1378–1381 (1939).

Goubeau et al.: Zeitschrift für Anorganische und Allgemeine Chemie, volume 275, page 172 (1954).

Aubrey et al.: J. Chem. Soc., pages 2927–2930 (1959).

UNITED STATES PATENT OFFICE
CERTIFICATE OF CORRECTION

Patent No. 3,052,718                  September 4, 1962

William David English

It is hereby certified that error appears in the above numbered patent requiring correction and that the said Letters Patent should read as corrected below.

Column 3, line 22, for "yield" read -- yielded --; line 32, for "perferably" read -- preferably --; same column 3, line 58, for "of" read -- to --; column 4, line 16, after "tribromide" insert -- and --; line 51, for "recvering" read -- recovering --.

Signed and sealed this 19th day of February 1963.

(SEAL)
Attest:

ESTON G. JOHNSON
Attesting Officer

DAVID L. LADD
Commissioner of Patents